US006360036B1

(12) United States Patent
Couillard

(10) Patent No.: US 6,360,036 B1
(45) Date of Patent: Mar. 19, 2002

(54) MEMS OPTICAL SWITCH AND METHOD OF MANUFACTURE

(75) Inventor: James G. Couillard, Newfield, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/483,669

(22) Filed: Jan. 14, 2000

(51) Int. Cl.[7] ................................................. G02B 6/35

(52) U.S. Cl. ............................ 385/19; 385/18; 359/128

(58) Field of Search ...................... 385/16–24; 359/124, 359/127, 128

(56) References Cited

U.S. PATENT DOCUMENTS

| | | | |
|---|---|---|---|
| 4,170,731 A | * 10/1979 | Howell et al. | 250/227.22 |
| 4,630,883 A | * 12/1986 | Taylor et al. | 385/47 |
| 4,844,577 A | * 7/1989 | Ninnis et al. | 385/9 |
| 5,119,448 A | 6/1992 | Schaefer et al. | 385/4 |
| 5,129,794 A | * 7/1992 | Beatty | 417/413 |
| 5,148,506 A | 9/1992 | McDonald | 385/16 |
| 5,226,099 A | 7/1993 | Mignardi et al. | 385/19 |
| 5,692,089 A | * 11/1997 | Sellers | 385/137 |
| 5,742,712 A | * 4/1998 | Pan et al. | 385/18 |
| 5,867,617 A | * 2/1999 | Pan et al. | 385/18 |
| 5,925,898 A | * 7/1999 | Spath | 257/98 |
| 5,995,688 A | * 11/1999 | Aksyuk et al. | 385/14 |
| 6,038,928 A | * 3/2000 | Maluf et al. | 73/724 |
| 6,195,478 B1 | * 2/2001 | Fouquet | 385/17 |

FOREIGN PATENT DOCUMENTS

| JP | 57-192902 A | * 11/1982 |
|---|---|---|
| JP | 11-044852 A | * 2/1999 |

OTHER PUBLICATIONS

"Micro–opto–mechanical devices fabricated by anisotropic etching of (110) silicon", J. Micromech. Microeng. 5 305 (1995).

"Arrays of thermal micro–actuators coupled to micro–optical components," Proc. SPIE 2865 74 (1996).

M. Tabib–Azar, Microactuators. Kluwer Academic Publishers (1998).

Brown et al., "Measurement of slow crack growth in silicon and nickel mechanical devices", Micro Electro Mechanical Systems, 1993, MEMS '93, Feb. 7–10, 1993, pp. 99–104.*

Brown et al., "Reliability and long term stability of MEMS", IEEE/LEOS 1996 Summer Topical Meetings, Aug. 5–9, 1996, pp. 9–10.*

(List continued on next page.)

Primary Examiner—Akm E. Ullah
Assistant Examiner—Michelle R. Connelly-Cushwa
(74) Attorney, Agent, or Firm—Joanne N. Pappas

(57) ABSTRACT

An optical switch on a planar optical circuit substrate includes a cantilevered arm having a control element selectively movable in a direction into the plane of the substrate into a waveguide slot of the substrate for switching optical signals carried by the waveguide. The arm can be actuated by thermal or piezoelectric actuators to deflect between a rest position allowing signal information from a waveguide to continue along the waveguide and a second position with the control element of the cantilevered arm extending into the slot for selectively blocking or changing the direction of the incoming signal. In an alternative embodiment of the invention, a second arm is provided which moves laterally and can be selectively actuated in sequence with the first cantilevered arm for overlying and latching the switching arm in the second or light controlling position, such that the MEMS switch can remain in an active state without further application of a control signal thereto. Arrays of MEMS switches are formed on a single wafer by selective etching and are bonded to arrays of optical waveguides to provide multiple switch modules.

22 Claims, 7 Drawing Sheets

OTHER PUBLICATIONS

Zhang et al., "An RIE process for submicron, silicon electromechanical structures", Transducers '91, Jun. 24–27, 1991, pp. 520–523.*

Giles et al., "A Silicon MEMS Optical Switch Attenuator and Its Use in Lightwave Subsystems", IEEE Journal of Selected Topics in Quantum Electronics, vol. 5, No. 1, Jan./Feb. 1999, pp. 18–25.*

Miller et al., "An Electromagnetic MEMS 2 ×2 Fiber Optic Bypass Switch", Transducers '97, (Jun. 1997), pp. 89–92.*

Mita et al., "An out–of–plane polysilicon actuator with a smooth vertical mirror for optical fiber switch application", LEOS Summer Topical Meetings, Jul. 20–24, 1998, pp. II/33–II/34.*

Reid et al., "Arrays of thermal micro–actuators coupled to micro–optical components", SPIE vol. 2865, (1996), pp. 74–82.*

Tabib–Azar, Massood, "Microactuators", Boston: Kluwer Academic Publishers, 1998, pp. 56–61.*

* cited by examiner

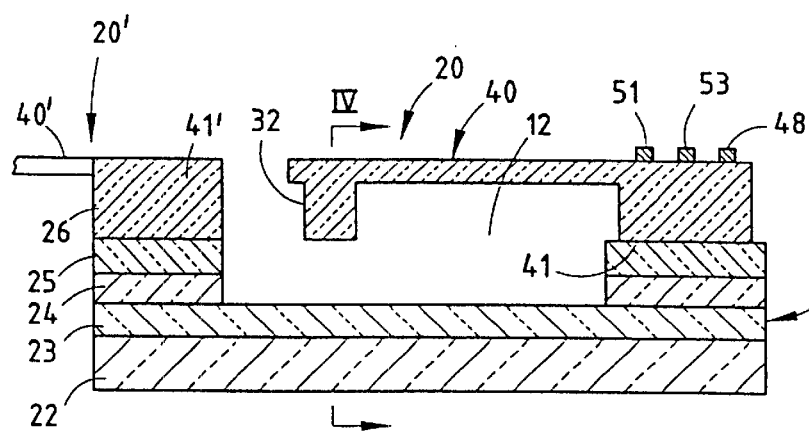
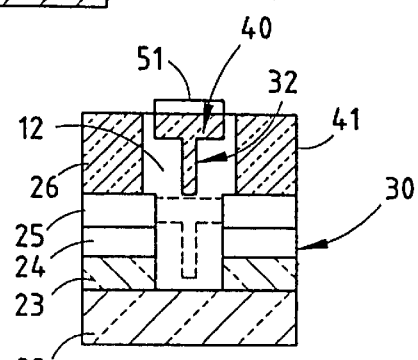
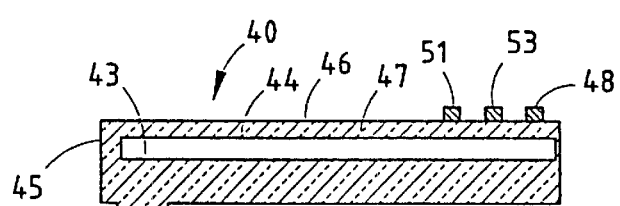
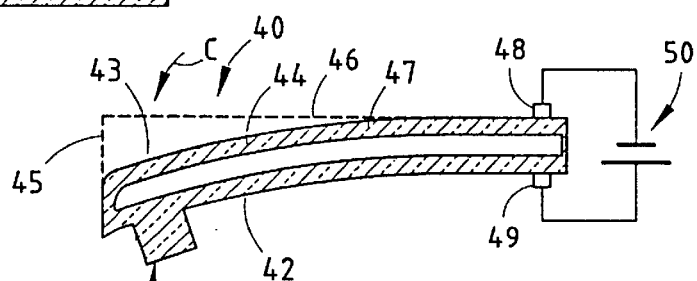
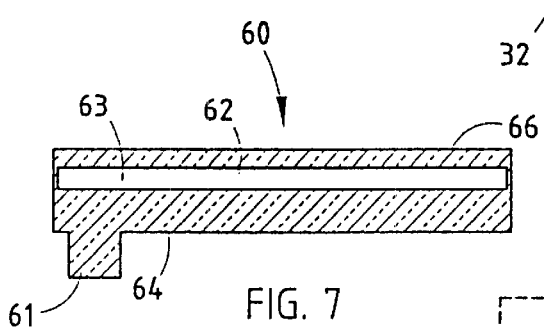
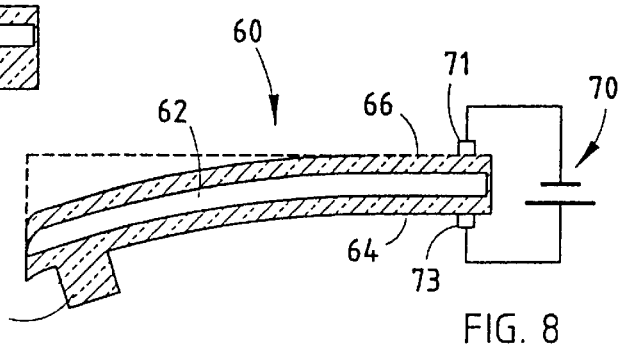

MEMS OPTICAL SWITCH AND METHOD OF MANUFACTURE

BACKGROUND OF THE INVENTION

1. Field of the Invention

The present invention relates to optical switches and particularly to MEMS switches.

2. Technical Background

Telecommunication systems utilizing optical waveguides require the use of optical switches for selectively coupling signal sources to one or more destinations. In planar optical components, MEMS switches have included a micro mirror positioned in a diagonal slot formed at the intersection of crossing planar waveguides having ports facing the slot. The micro mirror is moved laterally to reflect incoming light from one waveguide to an adjacent waveguide communicating with the slot to perform a switching function. Such devices for a 16×16 input/output switch module requires an array of 256 MEMS switches. Although prior MEMS devices provide adequate switching functions, they are difficult to manufacture and their construction does not allow the formation of electrical circuits on the switch module for coupling electro-optical components to the combined MEMS and optical component.

There exists a need, therefore, for an improved MEMS optical switch and an optical switch module including MEMS switches in which an array of MEMS switches are joined with a planar optical circuit and which is capable of receiving electrical circuits for coupling electro-optical devices to the planar optical circuit. There also exists a need for a process for forming multiple switch arrays and multiple planar optical circuit arrays which can be coupled for the mass production of optical switch modules.

SUMMARY OF THE INVENTION

The optical switch of the present invention satisfies this need by forming arrays of MEMS switches on a wafer substrate with each switch integrally including a cantilevered arm having a control element at one end for moving into a waveguide slot of planar optical circuit arrays to which the MEMS arrays are mounted. The control element moves in a direction orthogonal to the junction of the MEMS arrays and the optical circuit arrays and, in a preferred embodiment, comprises a mirror. The cantilevered arm can be actuated by thermal, piezoelectric, or electrostatic means to deflect the arm between rest and actuated positions. In the rest position, signal information from a waveguide port passes across the slot into a second waveguide port. When the switch is actuated, the mirrored end of the cantilevered arm extends into the slot for selectively blocking or changing the direction of the incoming signal directing the signal to the port of a different waveguide.

In an alternative embodiment of the invention, a second cantilevered arm is provided which moves in a plane orthogonally to the first cantilevered arm and is selectively actuated in sequence with the first cantilevered arm for overlying and latching the first or switching arm in an actuated position, such that the MEMS switch can remain in an active state without further application of a control signal thereto. In all embodiments, the optical switch module so formed allows the formation of electrical conductors on a surface for the coupling of electro-optical components to the planar optical circuit, as well as for the actuation of the MEMS switches. This invention also includes a method of simultaneously fabricating multiple optical switch modules utilizing masking, etching, depositing, and bonding steps to form such multiple optical switch modules, each with multiple arrays of fiber optical waveguides and arrays of MEMS switches as well as providing electrical circuits thereon.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

BRIEF DESCRIPTION OF THE DRAWINGS

FIG. 3 is a vertical cross-sectional schematic view of a MEMS switch of a first embodiment of the present invention;

FIG. 4 is a cross-sectional view of the switch shown in FIG. 3, taken along section lines IV—IV;

FIG. 5 is an enlarged detailed view of the cantilevered arm construction shown in FIG. 3, showing the switching arm in a first at rest position;

FIG. 6 is a view of the switching arm shown in FIG. 5, shown actuated in a deflected second position;

FIG. 7 is a schematic, vertical cross-sectional view of an alternative embodiment of a cantilevered arm, shown in a first at rest position;

FIG. 8 is a view of the cantilevered arm shown in FIG. 7, shown in an actuated second position;

DETAILED DESCRIPTION OF THE PREFERRED EMBODIMENT

Figure 1:
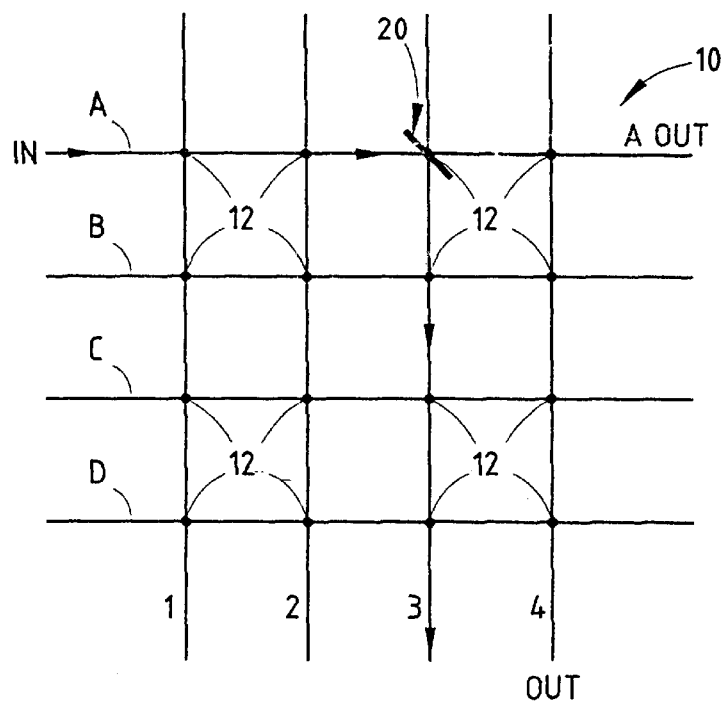
FIG. 1 is a schematic view of a switching module which embodies a plurality of MEMS switches of the present invention.

FIG. 1 is a schematic diagram showing an optical switch module 10 with an array of planar waveguides in the X/Y plane, such as waveguides A, B, C, and D, extending horizontally and crossing waveguides 1, 2, 3, and 4 extending vertically in the diagram. At each of the intersections of the waveguides there is formed a slot 12, as shown in the enlarged detail view of FIG. 2, which defines facing ports 15 and 17 of waveguide A and 11 and 13 of waveguide 3. Movably positioned within each slot of the switch module for movement in a vertical direction (i.e. in and out of the plane of FIGS. 1 and 2) is a MEMS switch 20 embodying the present invention. Thus, each of the waveguide intersections, shown in the switch 10 of FIG. 1, will include a MEMS switch having a micro mirror which, when not actuated, permits optical input signals on, for example, waveguide A to pass from port 15 to port 17 to conduct signals along waveguide A from its input to its output. When a MEMS switch is actuated (such as switch 20 in FIGS. 1 and 2), signals from the input of waveguide A at port 15 are reflected by the mirror of the MEMS switch onto port 13 of waveguide 3 to switch the signals from input A to output 3.

Alternatively, the MEMS switch, instead of including a micro mirror, may include an opaque material to selectively block the conducting of signals on a single waveguide providing an "on/off" function. Such construction is useful in a ring protection circuit where it is desired to stop the transmission of signals during a repair period along an optical pathway which has been damaged. More typically, a switching network, however, is provided such that multiple input lines can be selectively coupled to multiple output lines.

Figure 2:
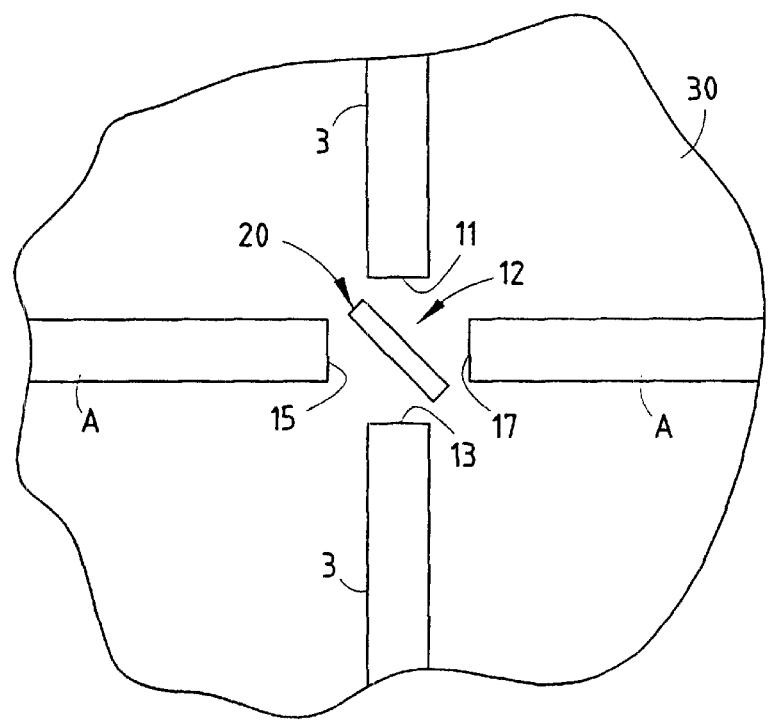
FIG. 2 is an enlarged, fragmentary top plan view of one of the switching nodes shown in FIG. 1.
Figure 9:
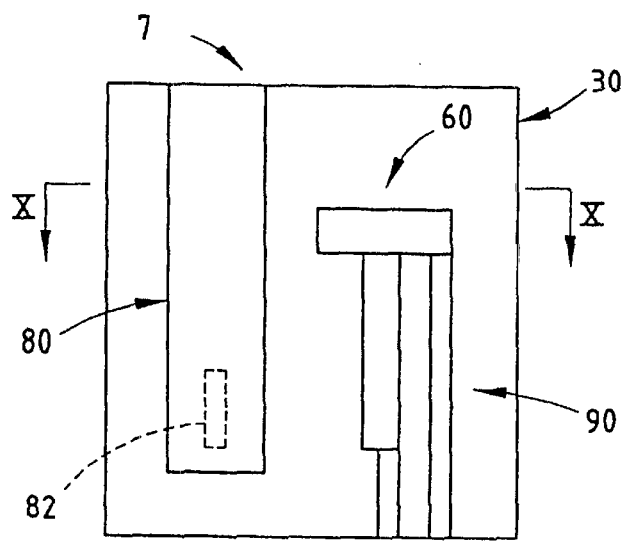
FIG. 9 is a top plan view of an alternative embodiment of a MEMS switch, including a latching arm.
Figure 10:
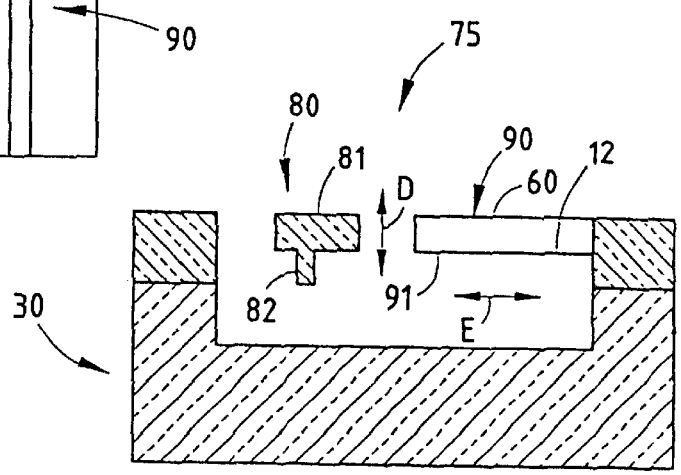
FIG. 10 is a cross-sectional view of the switch shown in FIG. 9, taken along section lines X—X.

One embodiment of an optical switch module including MEMS switches 20 of the present invention is shown in FIG. 3, which shows an individual switch. It is to be understood, however, that a continuous array of such switches are simultaneously formed to align with an associated array of waveguides. In FIG. 3, a planar lightwave optical circuit 30 having a substrate 22 of silica is provided on which there is deposited in a conventional manner a doped silica under cladding 23, a doped silica waveguide 24 (FIG. 4) and a doped silica over cladding 25. Interrupting the waveguide 24 and, for example, orthogonally positioned waveguides, such as shown in FIG. 2, is a slot 12 which selectively allows a control element 32 integrally formed at the end of a cantilevered arm 40 to selectively move between a position distal from slot 12, as shown in FIGS. 3 and 4, to a position within the slot, as shown in phantom lines in FIGS. 3 and 4 and in the optical pathway of the waveguides 24.

The fabrication of a MEMS switch forming one switch of an array and multiple arrays on a single wafer is shown in FIGS. 14–31. The arrays of switches are formed on a <110> single-crystal silicon wafer substrate, typically 100 mm in diameter, although other sized wafers may likewise be employed. An array of planar lightwave circuits 30, each associated with an array of MEMS switches, likewise are integrally formed on a silica wafer utilizing standard manufacturing techniques for forming a planar optical circuit including the flame hydrolysis deposition of the multiple layers and selective etching to form the switching slots 12.

The wafers, including the multiple arrays of MEMS switches and the multiple arrays of lightwave optical circuits are bonded using anodic bonding (with high fields such as 1 kV), fusion bonding at temperatures of approximately 1000° C. or with an interfacial adhesive layer combining the array of MEMS switches to the array of optical circuits. The bonding precision between the silicon wafers forming the MEMS switches and the silica lightwave optical circuits is approximately +/-2 micrometers laterally and may be accomplished utilizing alignment marks on the wafers with commercially available equipment such as an SUSS ABS 150 bond cluster. Once bonded, the individual arrays are separated by dicing, using either a laser cutter or more commonly with a precision diamond saw. The number of optical modules defined by a bonded lightwave optical circuit array and associated MEMS switch array naturally depends upon the size of each array but, for example, 21 4×4 arrays can be obtained from a 100 mm diameter wafer. Only four 32×32 switch modules will be available on a single wafer as the area consumed progresses geometrically.

The formation of the planar lightwave circuit is by conventional processes to yield the array of planar lightwave circuits to which the MEMS switches can be attached. The formation of the MEMS switches, however, is unique and is now described in connection with FIGS. 14–31, yielding the various geometries shown in FIGS. 5–13.

Figure 14:
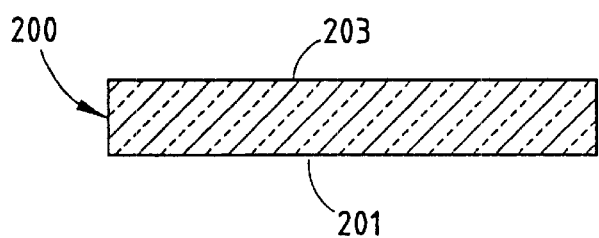
FIG. 14 is a schematic side elevational view illustrating a first step in the manufacturing of a MEMS switch according to the present invention.
Figure 15:
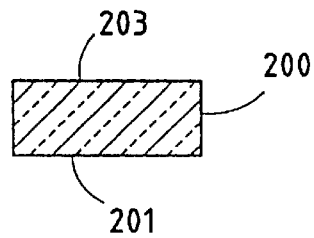
FIG. 15 is a cross-sectional view of the structure shown in FIG. 14.
Figure 16:
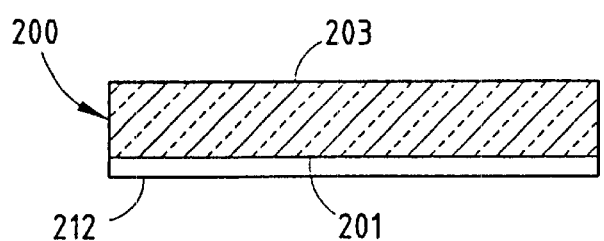
FIG. 16 is a schematic side elevational view illustrating a second step in the manufacturing of a MEMS switch according to the present invention.
Figure 17:
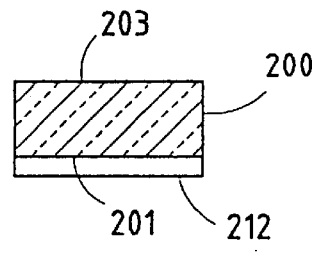
FIG. 17 is a cross-sectional view of the structure shown in FIG. 16.

Initially, as shown in FIGS. 14 and 15, a <110> single-crystal silicon wafer substrate having a thickness of about 20 microns in wafer form with a diameter of approximately 100 mm in one embodiment is provided. The lower surface, as seen in FIGS. 16 and 17, is masked with a mask 212 of silicon nitride ($Si_3N_4$) to allow the subsequent etching using photolithography to form the desired matrix pattern defining an array of individual switches. Other masking materials can likewise be employed as long as they are capable of withstanding the crystal lithographic etching solution described with respect to subsequent processing steps.

Figure 18:
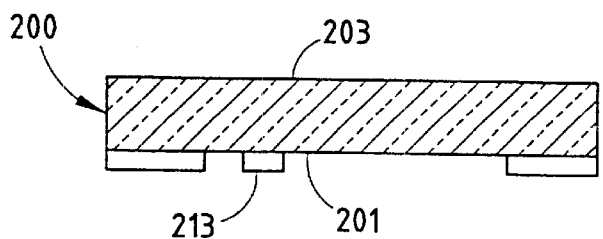
FIG. 18 is a schematic side elevational view illustrating a third step in the manufacturing of a MEMS switch according to the present invention.
Figure 19:
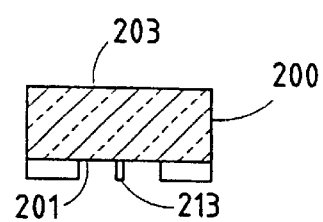
FIG. 19 is a cross-sectional view of the structure shown in FIG. 18.
Figure 20:
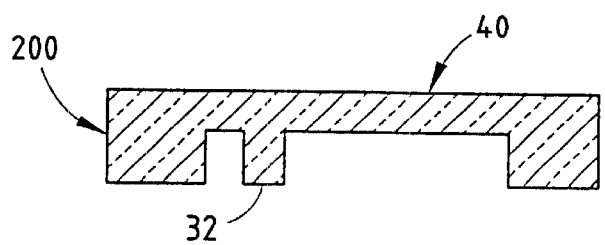
FIG. 20 is a schematic side elevational view illustrating a fourth step in the manufacturing of a MEMS switch according to the present invention.
Figure 21:
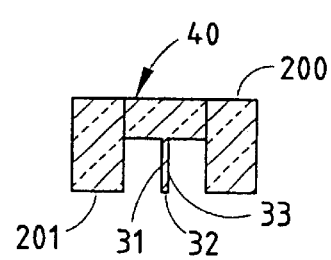
FIG. 21 is a cross-sectional view of the structure shown in FIG. 20.
Figure 22:
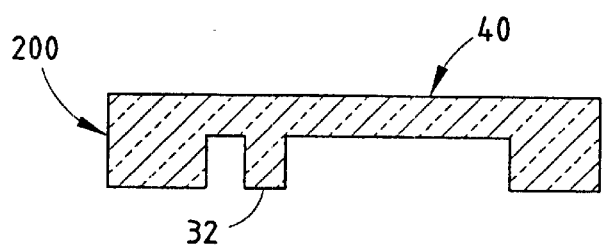
FIG. 22 is a schematic side elevational view illustrating a fifth step in the manufacturing of a MEMS switch according to the present invention.
Figure 23:
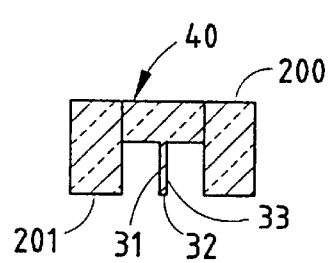
FIG. 23 is a cross-sectional view of the structure shown in FIG. 22.

Next, as indicated by FIGS. 18 and 19, the $Si_3N_4$ is exposed utilizing photolithography and reactive ion etching to form the initial geometry of the MEMS switches which results in defining the arm 40 and control element 32 of each of the switches. Thus, the tip of end 32 underlying the $Si_3N_4$ pad 213 (shown in FIG. 18) will subsequently become the control element for each MEMS switch. The areas of the lower surface 201 of the silicon wafer 200 are next etched utilizing an approximately 4 molar potassium hydroxide (KOH) solution and next the $Si_3N_4$ washed away, resulting in the structure shown in FIGS. 20 and 21 in which the arm 40 is partially formed, as is the control element 32. Other crystal lithographic etching solutions, such as ethylene diamine pyrocatechol or TMAH (tetramethylammonium hydroxide) may be used in place of KOH. It is important that the crystal lithographic etching solution, however, provide a high quality silicon mirror having a smooth surface capable of receiving a reflective layer, such as gold, which is deposited, as indicated by FIGS. 22 and 23, by thermal evaporation to a thickness of 40 nm on the opposite sides 31, 33 of the control element 32.

Figure 24:
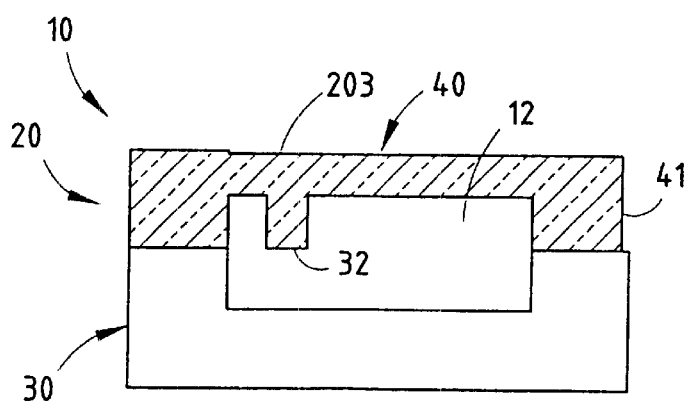
FIG. 24 is a schematic side elevational view illustrating a sixth step in the manufacturing of a MEMS switch according to the present invention.
Figure 25:
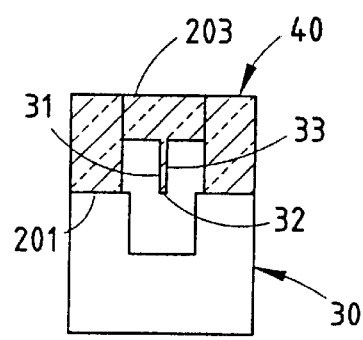
FIG. 25 is a cross-sectional view of the structure shown in FIG. 24.
Figures 26, 27:
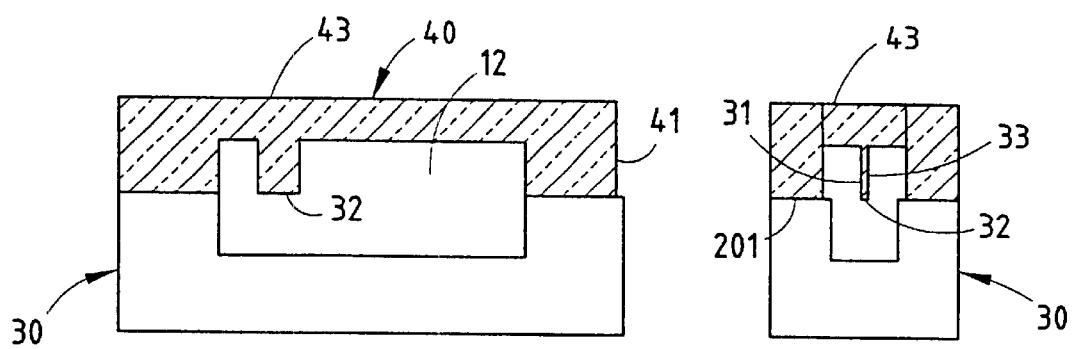
FIG. 26 is a schematic side elevational view illustrating a seventh step in the manufacturing of a MEMS switch according to the present invention.
FIG. 27 is a cross-sectional view of the structure shown in FIG. 26.
Figures 28, 29:
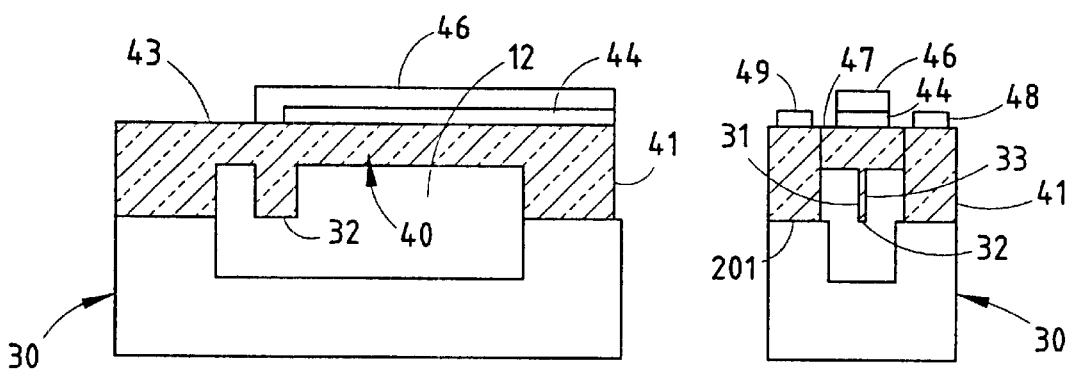
FIG. 28 is a schematic side elevational view illustrating a eighth step in the manufacturing of a MEMS switch according to the present invention.
FIG. 29 is a cross-sectional view of the structure shown in FIG. 28.

Next, the arrays of partially completed MEMS switches 20 are bonded to the planar optical circuit 30 as noted earlier by the anodic, fusion, or interfacial adhesive bonding. This results in the partially completed optical circuit as illustrated in FIGS. 24 and 25. The upper surface 203 of the silicon wafer can then be polished as desired or necessary so that the electrical circuits as shown in FIGS. 28 and 29 can be deposited thereon.

Figures 30, 31:
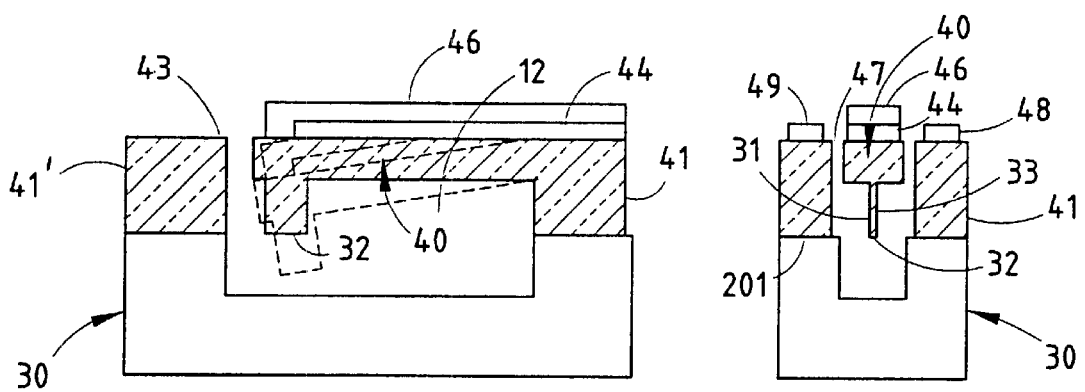
FIG. 30 is a schematic side elevational view illustrating a ninth step in the manufacturing of a MEMS switch according to the present invention.
FIG. 31 is a cross-sectional view of the structure shown in FIG. 30.

Next, a layer of insulator material 44 is deposited on the upper surface 43 of arm 40. The insulator can be any suitable material allowing the flexing of the arms, such as silica ($SiO_2$). Finally, a layer of conductive material 46, which heats upon the application of an electrical current thereto, is deposited over the insulating strip 44 forming an L-shaped conductive member which, when a control signal is applied between element 46 and the base 42 of arm 40, as seen in FIG. 6, the arm will deflect downwardly due to the larger thermal expansion of the member 46 as compared to the silicon base 42. The heating strip defined by the conductive layer 46 has a depth of approximately 2 microns and a conductive pad 49 is deposited on the base 42, as seen in FIGS. 6 and 29, to allow a control voltage to be applied between the conductive layer 46 and base 42, thereby heating the arm, causing its deflection to an actuated position. At this point of the construction and simultaneously with the depositing of contact 49, electrical conductors 48, and contact pads 51, 53 (FIGS. 3 and 4) for the attachment of electro-optical devices to the upper surface 43 of the MEMS switch matrices can be added such that electro-optical components can be integrally mounted to the switch matrix 10. Conductors 48 typically will be gold formed through a suitable mask to provide a pattern of conductors required for a given circuit construction. At this time in the manufacturing process, the cantilevered arm 40 is not yet free to move and reactive ion etching is applied to either side of the arm 40, as best seen in FIG. 31, to remove the bridge material and free the arm from the lateral supports between base 41 and arm 40.

Each MEMS switch of the array forming an optical switch module integrally includes a second base 41' with a second array of MEMS switches 20' with arms 40', as seen in FIG. 3. The control of the MEMS switches so formed is provided by a power source illustrated at 50 in FIG. 6, which represents a switched electrical control for applying current to heating elements 46 for selectively heating arms 40 which will subsequently bend downwardly, in a direction indicated by arrow C in FIG. 6, a distance of approximately 20 microns sufficient to block or reflect signals in waveguides 24 for either blocking a signal or switching a signal as illustrated in the network of FIG. 1.

Gap 12 typically will have the smallest width possible, such as 6 microns or less, while the width of control element 32 of cantilevered arm 40 is approximately one-third that of the gap to provide sufficient clearance for the movement of the MEMS switch element into and out of the optical pathway across gap 12. Arm 40 is thin enough to allow flexing through thermal heating as illustrated in FIG. 6 and yet thick enough to be sufficiently rigid to maintain its at rest or off position, as shown in solid lines in FIGS. 3–5.

The amount of current necessary to activate an arm having a thickness of approximately 20 microns, a length of approximately 350 microns and a width of approximately 50 microns was less than 10 milliamperes with an applied voltage of about 10 volts. The voltage and resultant current can be varied as desired for the given dimensions of the arm, however, only a relatively low voltage and current are necessary. The base 200 (FIG. 14) for forming the array of MEMS switches 20 on the planar optical circuit 10 may include numerous other electrical conductors, such as 51 and 53 illustrated in FIG. 3. for coupling to other electro-optical devices, such as photo diodes, solid state lasers, and the like, which may be employed with a planar optical circuit 30 on which the MEMS switch array is integrally formed. Thus, the area of upper surface 47 of the MEMS switches not occupied by the switching arrays provides an integral platform for the deposition of electrical conductors and for the mounting of electro-optical components thereto.

The cantilevered arm construction of the MEMS switches 20 allows the thermal actuation by utilizing an electrically actuated thermal strip 46 to cause the deflection of the arm as illustrated in FIGS. 5 and 6 for selectively switching signals in an optical network, such as shown in FIG. 1, by moving in a vertical direction, thereby freeing the space above the cantilevered arm at its base for the mounting of electro-optical components thereon. In place of the thermally actuated cantilevered arm, other actuating arms can be employed, such as shown in the schematic diagrams of FIGS. 7 and 8, now described.

In FIG. 7, a MEMS switch employing a cantilevered arm 60 is fabricated to include a reflective control element 61 in the same process as in the first embodiment. The array of switches are also bonded to an optical circuit (not shown) of the same construction and formed in substantially the same manner as the embodiment shown in FIGS. 3–6. In place of a layer of insulating material and a thermal-actuating element, however, a layer of piezoelectric material 62 is deposited on the upper surface 63 of the arms body 64 to a thickness of about 4 microns. The piezoelectric material can be, for example, PZT. An over-layer 66 of a metallic conductor having a thickness of about 2 microns covers the piezoelectric layer 62. Thus, the piezoelectric layer 62 is positioned between an upper conductive layer 66 and silicon base 64.

In the embodiment shown in FIGS. 7 and 8, conductive pads 71 and 73 are formed on the surfaces of conductors 66 and base 64, such that an actuating control signal represented by voltage source 70 can be applied to the cantilevered arm 60 causing its deflection as illustrated in FIG. 8. The arm 60 has substantially the same dimensions as control arm 40 shown in the previous embodiment. A 10 volt control signal provides a deflection of 20 micrometers, resulting in movement of the arm between an at rest position, illustrated in FIG. 7, to an actuated position, illustrated in FIG. 8.

In some applications, it is desired to have an optical switch, such as MEMS switches 20, maintained in an actuated state for extended period of time, such as when used as a protection device in a ring circuit during repairs of an optical communication network. In this and other instances (the switch normally can be actuated at a rate of, for example, 20 milliseconds), it would be necessary to apply a continuous voltage on the embodiment shown in FIGS. 7 and 8 or a continuous current as shown in the embodiments of FIGS. 3–6. In order to avoid the necessity of such continuous application of a control signal, a latching structure, shown in FIGS. 9–12, can be provided to selectively latch the MEMS switch in a downwardly light-blocking or reflecting position in the substrate slot 12. For purposes of illustrating this aspect of the invention, the planar optical waveguide structure supporting the switch and latching arms illustrated in these figures is not shown in detail.

Referring now to FIGS. 9–12, there is shown a pair of latching MEMS switch assemblies 75, each of which include a cantilevered switching arm 80 which can be of the construction shown in FIGS. 3–6 or 7 and 8 and which includes a mirror 82 extending in a plane orthogonal to arm 80. Thus, arm 80 moves upwardly and downwardly or vertically with respect to the planar lightwave circuit in a direction indicated by arrow D in FIG. 10, while latching arm 90 moves laterally or horizontally in a direction indicated by arrow E in FIGS. 10 and 12. Arm 90 is of substantially the same construction as the actuator arm shown in FIGS. 3–8 except it is formed to move in a plane orthogonal to the movement of arm 80 and responds to control signals to operate in sequence with switch arm 80 to latch the switch arm into an "on" or activated position as now described.

Figure 11:
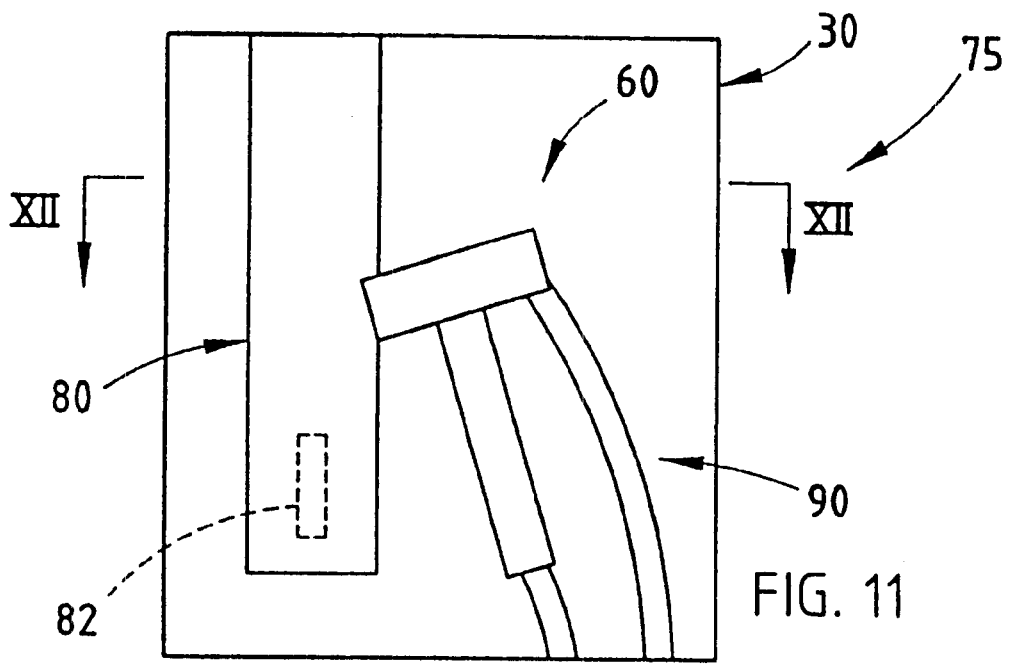
FIG. 11 is a top plan view of switch shown in FIGS. 9 and 10, shown in a latched position.
Figure 12:
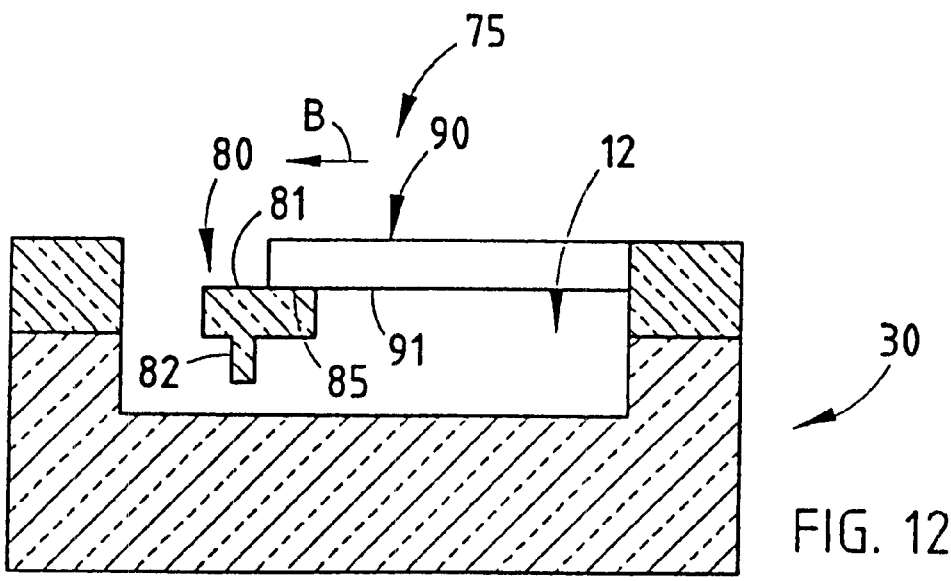
FIG. 12 is a cross-sectional view of the switch shown in FIG. 11, taken along section lines XII—XII.

As before, an electrical current or voltage is applied to the arm 80 depending upon its construction to cause it to move downwardly into an actuated position, as seen in FIG. 12, for blocking or reflecting light through the planar optical waveguide. While actuated and in its lowered position as shown in FIGS. 11 and 12, latching arm 90 is also activated by the application of a current or voltage thereto, causing it to move laterally in a direction indicated by arrow E over and engaging the top surface 81 of switch arm 80 with the lower surface 91 of arm 90 frictionally engaging the top surface 81 of arm 80. While a control signal is applied to latching arm 90, the control signal is removed from arm 80 such that it tends to move upwardly but is blocked from moving from the actuated position by its engagement with arm 90. The control signal to arm 90 can then be removed and the frictional engagement at the interface 85 between arms 80 and arms 90 prevents the further movement of either of the arms, thereby latching switch 75 so formed in an actuated state. When it is desired to move the light blocking or reflecting member 82 from the slot 12 in the optical waveguide circuit, the actuating signal is again applied to arm 80, causing it to deflect downwardly slightly thereby removing the frictional engagement at 85 and allowing arm 90 to return to its at rest, undeflected position shown in FIGS. 9 and 10. The control signal is then removed from arm 80, and it returns to its undeflected "off" position.

Figure 13:
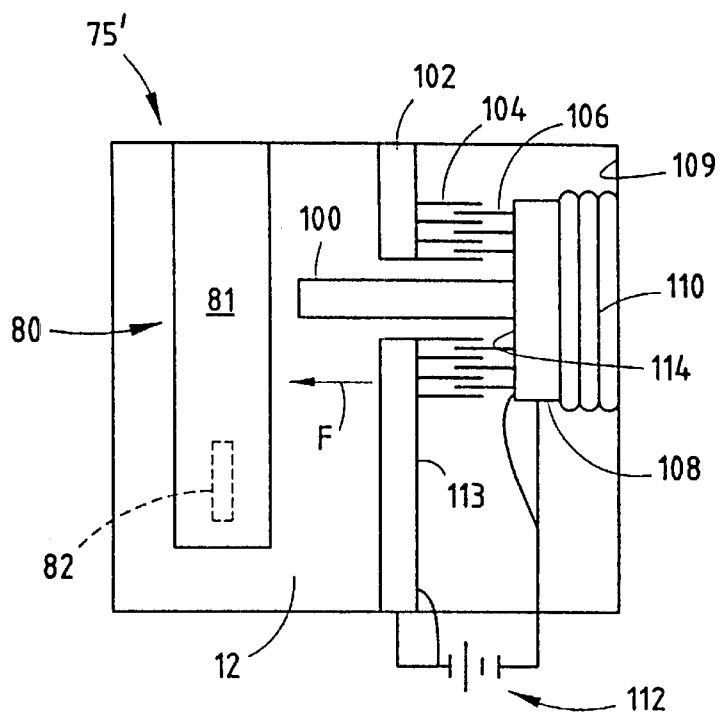
FIG. 13 is a schematic view of an alternative latching member which can be employed with the MEMS switches of the present invention.

Yet another embodiment of the latching switch is shown in FIG. 13 as 75' in which an actuating switching arm 80 is provided and a latching arm 100 is positioned to move laterally adjacent and over the upper surface 81 of arm 80. Arm 100 is an electro-statically movable arm comprising a vertically extending silicon substrate 102 having a plurality of spaced conductive plates 104 extending outwardly therefrom for receiving alternately staggered conductive plates 106 formed on an insulative substrate of silicon 108 coupled to the side wall 109 of a planar lightwave circuit substrate by means of a collapsible mounting structure 110 such as a bellows. The application of an electrical control signal through a power supply 112 (shown schematically in FIG. 13) to conductive surfaces 113 and 114 electrically coupled to plates 104 and 106, respectively, causes an electro-static attraction which moves the latch pin in a direction indicated by arrow F in FIG. 13 to selectively overly switch actuator arm 80. The sequence of operation is identical to that of the embodiment shown in FIGS. 9–12 with the switch arm 80 first being actuated then the latching arm 100 next being actuated, while the switch arm signal is then removed to cause a frictional engagement between the lower surface of arm 100 and the upper surface 81 of arm 80, at which time the control signal from source 112 can be disconnected from the actuator arm 100 and the optical switch remains in an activated position.

Thus, with the MEMS switching system of the present invention, multiple switch modules can be fabricated with each module including an array of MEMS switches and planar optical circuits to allow network switching of signals from one series of waveguides to another series of waveguides, provide on/off switching and other optical switching functions by providing an integrally formed optical circuit and MEMS switches which also accommodate electrical conductors for the mounting of electro-optical components to the optical circuit of the modules. Additionally, the present invention provides a latching arm, such that the MEMS switches can be latched in an actuated position without the continuous application of a control signal thereto.

It will become apparent to those skilled in the art that various modifications to the preferred embodiments of the invention as described herein can be made without departing from the spirit or scope of the invention as defined by the appended claims.

The invention claimed is:

1. An optical switch comprising:
   a substrate including an optical waveguide, wherein the waveguide includes spaced-apart ports;
   an arm mounted in a cantilevered manner to the substrate;
   an actuator for deflecting said arm in a plane orthogonal to the plane of the substrate;
   a control element mounted to said arm, whereby actuation of the arm moves the control element between the ports to control transmission of optical energy in the waveguide; and
   a latch arm mounted to the substrate and selectively coupled to the arm to hold the arm in an actuated position.

2. The optical switch of claim 1 wherein the latch arm includes an actuator for moving the latch arm in a direction orthogonal to the arm for overlying the arm when the arm and latch arm are actuated.

3. The optical switch of claim 2 wherein the actuator for the latch arm is a thermal actuator.

4. The optical switch of claim 2 wherein the actuator for the latch arm is a piezoelectric actuator.

5. The optical switch of claim 2 wherein the actuator for the latch arm is an electrostatic actuator.

6. The optical switch of claim 1 wherein the substrate defines a planar optical circuit integrally including at least one waveguide.

7. The optical switch of claim 6 wherein the optical circuit includes a slot formed therein to define the ports of the waveguide.

8. The optical switch of claim 7 wherein the control element of the cantilevered arm selectively extends into the slot.

9. The optical switch of claim 8 wherein the control element is a mirror.

10. The optical switch of claim 1 wherein the actuator is a thermal actuator.

11. The optical switch of claim 10 wherein the arm is fabricated of a silicon material and the thermal actuator includes a thin conductive film.

12. The optical switch of claim 1 wherein the actuator comprises a piezoelectric element coupled to the arm to deflect said arm.

13. A latching optical switch comprising:

a substrate including an optical waveguide, wherein the waveguide includes spaced-apart ports;

a switching arm mounted in a cantilevered manner to the substrate and including an actuator for deflecting said arm in a plane orthogonal to the plane of the substrate, such that a control element mounted to said arm moves between the ports to control the transmission of optical energy in the waveguide; and a latch arm mounted to the substrate and including an actuator to selectively move the latch arm over the switching arm to hold the switching arm in an actuated position.

14. An optical switch module comprising:

an array of orthogonally extending optical waveguides formed in a planar substrate with diagonal slots formed at the intersections of the waveguides to define input and output ports;

an array of MEMS switches mounted to the planar substrate, wherein each MEMS switch includes an arm mounted in a cantilevered fashion to the substrate;

an actuator for deflecting the arms in a plane orthogonal to the substrate;

a control element mounted to the arm, whereby the arm and control element are positioned on the substrate to selectively extend into a slot to switch the optical energy in one waveguide of the substrate to another waveguide of the substrate; and a latch arm mounted to the substrate and selectively coupled to the arm to hold the arm in an actuated position.

15. The optical switch of claim 14 wherein the latch arm includes an actuator for moving the latch arm in a direction orthogonal to the arm for overlying the arm when the arm and latch arm are actuated.

16. The optical switch of claim 15 wherein the actuator for the latch arm is a thermal actuator.

17. The optical switch of claim 15 wherein the actuator for the latch arm is a piezoelectric actuator.

18. The optical switch of claim 15 wherein the actuator for the latch arm is an electrostatic actuator.

19. The optical switch of claim 14 wherein the control element is a mirror.

20. The optical switch of claim 14 wherein the actuator is a thermal actuator.

21. The optical switch of claim 20 wherein the arm is fabricated of a silicon material and the thermal actuator includes a thin conductive film.

22. The optical switch of claim 14 wherein the actuator comprises a piezoelectric element coupled to the arm to deflect said arm.

* * * * *